United States Patent Office 2,963,824
Patented Dec. 13, 1960

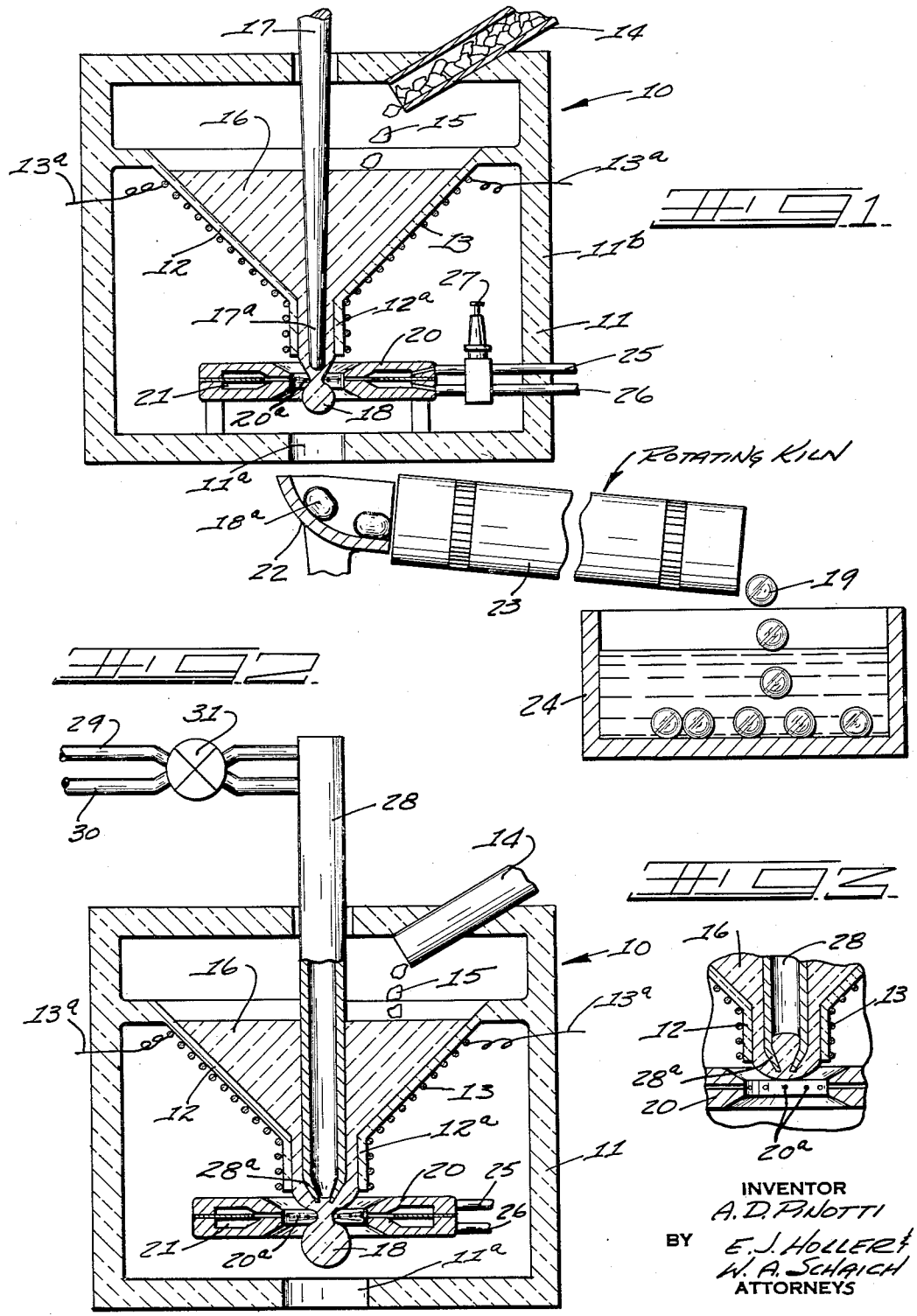

2,963,824
METHOD FOR PRODUCING GLASS BEADS
Alfred D. Pinotti, Toledo, Ohio, assignor to Kimble Glass Company, a corporation of Ohio
Filed Dec. 11, 1957, Ser. No. 702,198
1 Claim. (Cl. 49—85)

The invention relates to an improved method and apparatus for making small glass spheres or spherules commonly referred to as "glass beads."

The subject glass beads are to be distinguished from hollow beads or beads pierced by holes for stringing. The term "glass beads" as used herein generally applies to small solid spheres which are commercially employed in large quantities in many fields, one of which is for packing distillation columns in chemical research and industry.

The beads may also be employed in the production of motion picture screens, reflecting road signs, road markers, advertising signs where it is the practice to embed glass beads of small diameter in an adhesive matrix, and other articles wherein the beads serve as reflectors for light projected thereagainst. It is highly desirable that the beads be substantially spherical rather than irregularly or non-spherically shaped since these shapes cause diffraction of light rays to at least partially destroy their deflecting effect. Glass beads for these uses are usually transparent and uncolored although colored beads may sometimes be utilized.

Heretofore, the production of small diameter glass beads of essentially uniform size and constituting true spheres has presented certain manufacturing difficulties. It is common practice to form the beads from preformed glass rod or tubing which is fed into a prescribed pattern of several burner flames. Droplets of the glass are separated from the main body of the solidified glass by heating an end of the rod or tube and allowing each droplet to separate by gravity upon its being heat-softened by the burner fires. Producing beads in this manner requires that the glass be first fabricated into rod, cane or tubing suitable for feeding glass bead-making machines. Also, the size of the beads is limited to an order of about 6 mm. maximum diameter irrespective of the diameter of the rod or tube.

Additionally, still smaller diameter glass beads have been produced by dropping or projecting small particles of matrix-forming material through or into flames which will heat-soften the particles and cause them to assume a spherical shape. Such attempts to make nearly uniform, larger sizes of beads have been unsatisfactory because small particles of ground glass, for example, cannot be subjected to uniform heat or to a uniform period of treatment. When dropped through a zone of flame, few particles remain in the heat zone for a sufficient length of time to become properly or uniformly softened to be converted into spheres. Therefore, the yield of spherical bodies is only a small percentage of the total amount of ground glass particles dropped or projected through the flame.

Accordingly, it is an object of the present invention to provide a simplified method and apparatus for producing glass or vitreous beads directly from a molten supply source. A downwardly flowing stream of molten glass, for example, emits from an orifice of controlled dimensions. The stream of glass discharging from the orifice is intercepted by a pattern of burner fires capable of separating the stream into severed charges or gathers of molten glass. These charges are then conveyed into a rotating cylinder or kiln which serves to finally shape the respective charges of glass into spherical form.

Another object of the invention is to provide a simplified operating mechanism for moving a suspended charge or gather of molten glass into a zone of severance comprising a flame curtain played over the surface of the material to both obtain a smoother surface and a severance of the charge from its supply source. Proper control of the accumulating and discharging mechanism at the supply orifice facilitates the charge delivery. The concentrated intersecting jets of flame may quickly sever each charge during the interval that the charge is suspended through the severance curtain of flame.

The invention provides both novel apparatus and process for producing glass beads from individual molten charges in a cheap and rapid manner so that the beads may subsequently be shaped into essentially spheroidal form by surface contacting mechanism during their cooling.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the drawings like reference characters indicate corresponding parts in all the views:

Fig. 1 is a vertical sectional view partly in elevation of bead making appaartus embodying this invention.

Fig. 2 is a view similar to Fig. 1 showing a modification of the charge forming apparatus during the discharging step.

Fig. 3 is fragmentary sectional view of the charge forming area of Fig. 2 during the accumulating step.

The present apparatus for forming glass beads consists of a supply source for furnishing a continuous stream of molten glass through an annular outlet. A ring-type burner having a plurality of nozzles directed at a common intersection coincidental with the vertical axis of the supply outlet is disposed immediately below the outlet. Accumulating and discharging means are arranged integrally with the outlet for furnishing pendent charges of molten glass into a stream-disjoining zone within the burner fires. The series of burner fires are capable of severing the molten glass into individual charges of substantially uniform weight.

While the invention as herein described is particularly applicable to producing glass beads, it is fully contemplated that it is equally useful for producing beads or spheres of other vitreous materials such as low-melting ceramics or solder glasses.

The apparatus includes a charge forming container or housing 10 which constitutes an insulated chamber 11 within which the glass or vitreous material is melted. A cone-shaped funnel 12 is mounted within the upper region of chamber 11 supported by its side walls. Funnel 12 has a tubular throat 12a at its lower extremity which provides an outlet for the melted glass. The lower conical surfaces and throat of funnel 12 are surrounded by a contacting electrical resistance heating coil 13 which is connected to electrical terminals 13a. Coil 13 when energized thus supplies heat to the funnel 12 for melting the glass 16 and maintaining the same in molten condition.

An inlet tube 14 is provided in the top surface of chamber 11 for introducing pieces of glass cullet 15 into the supply body of molten glass 16 contained within the funnel 12. A stationary or rotating plunger 17 extends through an opening 11a in the top surface of chamber 11 coaxially through and beyond a central region of the funnel throat 12a. Thus, the heated supply vessel for the melted glass 16 is provided with an annular or ring-like opening through which a stream of glass may be discharged.

Plunger 17 has tapering side surfaces especially on its lower end 17a and may be moved upwardly and downwardly to control the dimensions and contour of the funnel outlet. It is preferred that the lower extremity of plunger end 17a extend downwardly slightly beyond the lower end of funnel throat 12a.

A burner ring 20 is mounted immediately below the annular outlet for the glass stream. The burner 20 is mounted with its center coincidental with the vertical axis of plunger 17 and funnel throat 12a. Burner 20 is provided with an inwardly facing plurality of nozzles 20a adaptable to projecting jets of flame toward a common axis of the discharging glass stream. Burner 20 is provided with an internal annulus 21 which supplies a combustible gaseous mixture to each of the burner nozzles 20a. Annulus 21 is supplied with the gaseous mixture comprised of natural gas and oxygen, for example, by supply lines 25 and 26 respectively. A mixing valve 27 is mounted in supply lines 25 and 26 adjacent the burner to regulate the composition of the flammable gaseous mixture. Access to the valve 27 may be provided by a plug 11b disposed within an opening in the chamber sidewall.

The annular outlet immediately above the burner supplies a pendent stream of molten glass which is intermittently severed by the burner 20 when a proper charge or gather of glass 18 is discharged and suspended therefrom. Burner 20 provides a transverse curtain of flame comprising a plurality of inwardly projecting jets of high-temperature flame through which the charge 18 must pass and is separated in its upper region during its suspension.

Control over the size of each individual charge or gob is attained by having the glass at a proper temperature and thus at a desirable viscosity. Also, the burner flames are adjusted to furnish the curtain of flame having a desirable temperature for effecting the separation of each gather of molten glass. Obviously, these characteristics are readily determined for each particular glass to be melted and converted into glass beads by proper adjustment of the heat introduced by coil 13 and burner 20.

As shown in Fig. 1, plunger 17 may be comprised of a solid smoothly tapered needle of high-temperature resisting metal such as platinum, platinum alloy or refractory material. Each charge of molten glass is severed transversely immediately below the lower extremity of the plunger. The funnel 12 may also be fabricated of high-temperature resisting metal, alloy or refractory material which does not affect the glass and has good thermal conductance.

Each of the separated glass charges 18a falls freely from the main supply source through an opening 11a in the bottom of the insulated chamber. The charges 18a impinge upon a sloping stationary chute 22 of refractory material and are then conveyed into the upper end of a rotating cylinder or kiln 23 for final shaping. The cylinder 23 is preferably one having internally spiralled sidewalls or rifling over which each of the charges independently rolls and assumes a spherical contour during its cooling. The cylinder is rotated in an inclined plane and has structural features known in the art.

When the glass beads 19 are discharged from the shaping and cooling cylinder 23, they may drop into a water tank 24 or an empty vessel for collection and further cooling to atmospheric temperature.

In the modification of the present invention shown in Figs. 2 and 3, the funnel throat 12a is illustrated having a greater internal diameter. The plunger 28 constitutes a hollow cylindrical tube having a tapering lower end 28a which opens into the pendent glass stream. The upper end of plunger 28 is provided with both an air line 29 and a vacuum line 30.

Air and vacuum lines 29 and 30 respectively are connected to a rotary valve 31 which is in turn connected by independent lines to the central opening in tubular plunger 28. When the valving action of valve 31 is effected as by mechanical means (not shown), vacuumizing and pressurizing effects are independently exerted on the glass stream at the lower plunger end 28a. During the interval when a vacuum is applied to the orifice area, the glass 16 is drawn upwardly into the hollow lower region of plunger end 28a holding a prescribed portion of the glass above the curtain of flame provided by burner 20 as shown in Fig. 3. After a brief interval during further rotation of valve 31, the vacuumizing action is replaced by positive air pressure applied to the upper end of plunger 28 which in turn quickly drives the charge of glass out of the lower end of the plunger tube through the severance plane of flame provided by the burner ring leaving the charge 18 suspended as shown in Fig. 2. Insufficient air is applied to plunger 28 in the valving action to introduce air bubbles into the glass, but merely enough positive pressure to supplement gravity in downwardly discharging the glass charge more quickly through the curtain of flame. Burner 20 is preferably operated continuously to provide a transverse stationary curtain of flame through which the glass passes upon issuance from funnel throat 12a. The flames are regulated to attain separation of the glass body into charges 18a of essentially uniform size and weight as desired. However, the burner may also be operated intermittently in timed synchronism with the discharge action of tubular plunger 28, for example (Fig. 2) to sever charges 18 while hanging pendently from the discharge orifice.

With alternating vacuumizing and pressurizing action applied to the glass stream at its outlet, uniform charges 18a of molten glass for bead formation are supplied to the finally shaping rotating cylinder 23.

In practicing the steps of the method shown in Figs. 2 and 3, larger gathers of molten glass for bead formation than heretofore attainable are provided to the final shaping element, namely, cylinder 23. Glass beads considerably larger than 6 mm. in diameter may be quickly and efficiently formed by the apparatus and process described hereabove. Beads having relatively uniform diameters in the range of from about 6 to 20 mm. may be expeditiously produced hereby possessing outstanding properties of strength, size, and contour.

Various other modifications may be resorted to within the spirit and scope of the appended claim.

I claim:

The method of producing glass beads or spheres having a diameter of about 6 mm. or greater comprising the steps of flowing a stream of molten glass from a heated supply source through a stationary annular orifice of controlled dimensions, said orifice having axially-disposed vacuumizing and pressurizing means opening into said stream for delivering pendent charges of molten glass therefrom, alternately accumulating and discharging pendent charges of molten glass from said orifice by said vacuumizing and pressurizing means, contacting each of said pendent charges with a stationary annular horizontal curtain of flame disposed adjacent said orifice, said annular curtain of flame comprising an inwardly-projecting radial series of high-temperature burner fires, severing said pendent charges of molten glass by said annular curtain of flame, allowing the respective charges to fall freely, and shaping each of said individual charges into substantially spherical form within a hollow rotating cylinder during their cooling.

References Cited in the file of this patent

UNITED STATES PATENTS

| 1,315,668 | Howard | Sept. 9, 1919 |
| 1,945,871 | Stuckey | Feb. 6, 1934 |
| 2,250,110 | Kucera | July 22, 1941 |
| 2,461,011 | Taylor et al. | Feb. 8, 1949 |
| 2,500,801 | Church | Mar. 14, 1950 |
| 2,616,124 | Lyle | Nov. 4, 1952 |
| 2,739,348 | Rayburn | Mar. 27, 1956 |